(12) United States Patent
Choi (10) Patent No.: US 8,463,857 B2
(45) Date of Patent: Jun. 11, 2013

(54) NOTIFICATION OF INTERNET SERVICE EVENTS USING INSTANT MESSAGING SERVICE

(75) Inventor: Sung-Wone Choi, Seoul (KR)

(73) Assignee: NHN Corporation, Seongnam-si (KR)

(*) Notice: Subject to any disclaimer, the term of this patent is extended or adjusted under 35 U.S.C. 154(b) by 1369 days.

(21) Appl. No.: 11/924,447

(22) Filed: Oct. 25, 2007

(65) Prior Publication Data

US 2008/0065725 A1    Mar. 13, 2008

Related U.S. Application Data

(63) Continuation of application No. PCT/KR2006/001575, filed on Apr. 26, 2006.

(30) Foreign Application Priority Data

Apr. 26, 2005    (KR) .................... 10-2005-0034656

(51) Int. Cl.
*G06F 15/16*    (2006.01)

(52) U.S. Cl.
USPC ........................... 709/206; 709/204; 709/205

(58) Field of Classification Search
USPC ........................................ 709/204, 205, 206
See application file for complete search history.

(56) References Cited

U.S. PATENT DOCUMENTS

| | | | | |
|---|---|---|---|---|
| 7,162,513 B1* | 1/2007 | Kister et al. | ................. | 709/206 |
| 7,317,716 B1* | 1/2008 | Boni et al. | ................. | 370/352 |
| 7,653,191 B1* | 1/2010 | Glasser et al. | ............. | 379/201.1 |
| 2002/0021307 A1* | 2/2002 | Glenn et al. | ................. | 345/753 |
| 2003/0018509 A1* | 1/2003 | Ossip et al. | ................. | 705/9 |
| 2004/0068574 A1* | 4/2004 | Costa Requena et al. | ..... | 709/230 |
| 2005/0044082 A1* | 2/2005 | Chande et al. | ................. | 707/10 |
| 2005/0177732 A1* | 8/2005 | Flom et al. | ................. | 713/182 |
| 2006/0095397 A1* | 5/2006 | Torres et al. | ................. | 707/1 |
| 2012/0072590 A1* | 3/2012 | Holt et al. | ................. | 709/224 |
| 2012/0259938 A1* | 10/2012 | Brabec et al. | ................. | 709/206 |
| 2013/0005361 A1* | 1/2013 | Fish | ................. | 455/456.3 |

FOREIGN PATENT DOCUMENTS

| | | |
|---|---|---|
| JP | 11-112521 | 4/1999 |
| JP | 2002-305552 | 10/2002 |
| JP | 2004-005092 | 1/2004 |
| JP | 2004-013303 | 1/2004 |
| JP | 2004-505363 A | 2/2004 |
| JP | 2004-078566 | 3/2004 |
| JP | 2004-312730 | 11/2004 |
| JP | 2004-326319 | 11/2004 |
| JP | 2004-334428 | 11/2004 |
| WO | 02/09437 | 1/2002 |

* cited by examiner

*Primary Examiner* — Wing F Chan
*Assistant Examiner* — Kostas Katsikis
(74) *Attorney, Agent, or Firm* — H.C. Park & Associates, PLC (57) ABSTRACT

Disclosed is a notification system and method using messenger. The system includes a messenger system for controlling instant message transmission, monitoring messenger user state change, and transmitting user state change information; an external service system for monitoring occurrence of events and generating notification message indicating occurrence of the events; and a synchronization server for receiving the user state change information from the messenger system, providing the received user state change information to the at least one external service system, receiving the notification message from the at least one external service system, and transmitting the notification message to the messenger system. The external service system receives the user state change information from the synchronization server and manages messenger user online information, in case of the event occurrence.

24 Claims, 9 Drawing Sheets

NOTIFICATION OF INTERNET SERVICE EVENTS USING INSTANT MESSAGING SERVICE

CROSS-REFERENCE TO RELATED APPLICATIONS

This application is a continuation application under 35 U.S.C. §365(c) of International Application No. PCT/KR2006/001575, filed Apr. 26, 2006 designating the United States. International Application No. PCT/KR2006/001575 was published in English as WO2006/115357 A1 on Nov. 2, 2006. This application further claims the benefit of the earlier filing date under 35 U.S.C. §365(b) of Korean Patent Application No. 10-2005-0034656 filed Apr. 26, 2005. This application incorporates herein by reference the International Application No. PCT/KR2006/001575 including the International Publication No. WO2006/115357 A1 and the Korean Patent Application No. 10-2005-0034656 in their entirety.

BACKGROUND

1. Field

The present disclosure relates to instant messaging services, more particularly to notifying instant messaging service users of certain events occurring in other internet services that the users are subscribing.

2. Discussion of the Related Technology

Recently, instant messaging services or messenger services have become popular for instantly sending and receiving messages among internet users. Typically the messenger services use messenger software to enable the instant communication. The popularity of the messenger services appears to foster other internet services as the messenger software provides the platform for such services as, game services between messenger users, real time news services and real time shopping services.

SUMMARY

One aspect of the invention provides a method of operating an internet messaging service, which comprises: transmitting user on-line information in response to the user's log-in with a messenger server for an instant messaging service, wherein the user on-line information is directed to a designated internet address; receiving a notification directed to the user while the user is on-line with the messenger server, wherein the notification is configured to notify an occurrence of a predetermined event in an internet service which the user subscribes; and forwarding the notification to a computer associated with the user.

In the foregoing method, the internet address may be of a service server of the internet service. The internet address may be of an internet device interfacing the messenger server and a service server of the internet service. The method may further comprise transmitting user off-line information in response to the user's log-off from the messenger server, wherein the user off-line information is directed to the designated internet address. The internet service may comprise an emailing service, and wherein the predetermined event may comprise a receipt of an incoming email to the user in the emailing service. The internet service may comprise a message posting service accessible by a plurality of users, and wherein the predetermined event may comprise a posting of a message in the message posting service.

Another aspect of the invention provides a method of operating an internet service, which comprises: receiving, by a service server of an internet service, user on-line information indicative of a user's status of on-line with a messenger server for an instant messaging service; receiving, by the service server, user off-line information indicative of a user's status of off-line with the messenger server; and transmitting a notification in response to an occurrence of a predetermined event occurring after receiving the on-line information and before receiving the off-line information, wherein the notification is directed to the user.

In the foregoing method, the notification may be transmitted to the messenger server. The notification may be transmitted to a designated internet address other than the messenger server. The internet service may comprise an emailing service, and wherein the predetermined event may comprise a receipt of an incoming email to the user in the emailing service. The internet service may comprise a message posting service accessible by a plurality of users, and wherein the predetermined event may comprise a posting of a message in the message posting service.

Yet another aspect of the invention provides a device for interfacing between two service servers, which comprises: a first socket configured to communicate with a messenger server for an instant messaging service, wherein the first socket is configured to receive a first packet comprising user on-line information indicative of a user's status of on-line with the instant messaging service, wherein the first packet further comprises first protocol information indicative of a first protocol for use in processing the user on-line information in the messenger server; a second socket configured to communicate with for a service server for an internet service other than the instant messaging service, wherein the second socket is configured to transmit a second packet comprising the user on-line information; and a processor configured to convert the first protocol information to second protocol information indicative of a second protocol for use in processing the user on-line information in the service server, wherein the second packet further comprises the second protocol information.

In the foregoing device, the second socket may be further configured to receive a third packet comprising a notification from the service server, wherein the notification may be configured to notify a predetermined event in the internet service associated with a user subscribing both the instant messaging service and the internet service. The first socket may be further configured to transmit a fourth packet comprising the notification, wherein the third packet may further comprise third protocol information indicative of the second protocol, wherein the fourth packet may further comprise fourth protocol information indicative of the first protocol. The processor may be further configured to convert the third protocol information to the fourth protocol information. The device may further comprise a third socket configured to communicate with the service server, wherein the third socket may be configured to receive a notification from the service server, wherein the notification may be configured to notify a predetermined event in the internet service associated with a user subscribing both the instant messaging service and the internet service.

A further aspect of the invention provides a method of operating a device for interfacing between an instant messaging service and another internet service, which comprises: receiving, from a messenger server of an instant messaging service, user on-line information indicative of a user's status of on-line with the messenger server; transmitting the user on-line information to a service server associated with an internet service, which the user subscribes, such that the service server is informed of the user's status of on-line with the messenger server; receiving, from the service server, a notification of an occurrence of a predetermined event associated with the user in the internet service, when the predetermined event occurs during the user's on-line with the messenger server; and transmitting the notification to the messenger server so as to notify the user while the user is on-line with the messenger server.

In the foregoing method, the method may further comprise receiving user off-line information indicative of the user's status of off-line from the messenger server, and transmitting the user off-line information to the service server such that the service server is informed of the user's status of off-line from the messenger server. The user on-line information may be received and transmitted as part of a packet comprising data indicative of a protocol for use in processing the user on-line information. The messenger server may be configured to use a first protocol, wherein the service server may be configured to use a second protocol, wherein the received packet comprising the user on-line information may comprise data indicative of the first protocol, and wherein the method may further comprise changing the first protocol to the second protocol before transmitting.

Still in the foregoing method, the notification may be received and transmitted as part of a packet comprising data indicative of a protocol for use in processing the notification. The messenger server may be configured to use a first protocol, wherein the service server may be configured to use a second protocol, wherein the received packet comprising the notification may comprise data indicative of the second protocol, and wherein the method further comprises changing the second protocol to the first protocol before transmitting. The internet service may comprise an emailing service, and wherein the predetermined event may comprise a receipt of an incoming email to the user in the emailing service. The internet service may comprise a message posting service accessible by a plurality of users, and wherein the predetermined event may comprise a posting of a message in the message posting service.

An aspect of the present invention provides a system and a method that can notify events occurring in various services through messenger while minimizing server load. Another aspect of the present invention provides a notification system using messenger that can provide notification messages to only users that are online in messenger, by which the number of notification message packets can be minimized.

An aspect of the present invention provides a notification system using messenger comprising: a messenger system for controlling instant message transmission of messenger users, monitoring messenger user state change, and transmitting user state change information; at least an external service system for monitoring occurrence of predetermined event and generating notification message indicating occurrence of the event; and a synchronization server for receiving the user state change information from the messenger system, providing the received user state change information to the at least one external service system, receiving the notification message from the at least one external service system, and transmitting the notification message to the messenger system, wherein the at least one external service system receives the user state change information from the synchronization server and manages messenger user online information, in case of the event occurrence, the at least one external service system further determines if a user associated with the event is in online state, generates the notification message and transmits the notification message to the synchronization server.

The external service system includes email system, blog system and the community system. When the external service system is the email system, the event is email arrival event, when the external service system is blog system or the community system, the event is posting of new message. When trouble occurs in the external service system, the external service system transmits whole online user request information to the synchronization server, and the synchronization server provides whole online user information to the external service system through communication with the messenger system. When the messenger system is reset, the synchronization server provides reset information of the messenger system to the external service system, and the external service system updates the messenger online user information in response to the reset information.

The synchronization server comprises sockets for communicating with a predetermined server of the messenger system and a predetermined server of the external service system, and the synchronization server transmits/receives packet by packet communication method. The user state change information packet transmitted from the messenger system to the synchronization server and the notification message packet transmitted from the external service system to the synchronization server include a packet code field, a command field, a session ID field, a packet ID field, a body size field and a body field. The synchronization server transforms protocol of the user state change information packet and transmits the transformed protocol packet to the external service system; the synchronization server transforms protocol of the notification protocol packet and transmits the transformed protocol packet to the messenger service system. The protocol is transformed by transforming parameter written in the command field into parameters associated with corresponding system.

Another aspect of the present invention provides a device for notifying event that occurred in an external service system through messenger system, comprising: at least a first socket for communication with the external service system; and a second socket for communication with the messenger system, wherein the second socket receives messenger user state change information from the messenger service system and provides the user state change information to the first socket, the first socket transmits the provided user state change information to the external service system, the first socket receives event occurrence information from the external service system and provides the event occurrence information to the second socket, the second socket provides the event occurrence information to the messenger service system, the external service system manages online user information using the user state change information, when a user associated with event that occurred is in online state, the event occurrence information is transmitted through the first socket.

The first socket comprises: a listener for receiving the event occurrence information from the external service system; a reader for reading packet received in the listener; a handler for providing event occurrence information read in the reader to the second socket; and a writer for transmitting the user state change information provided from the second socket to the external service system. The second socket comprises: a listener for receiving the user state change information from the messenger system; a reader for reading received information in the listener; a handler for providing the read user state change information in the reader to the first socket; and a writer for transmitting the event occurrence information provided from the first socket to the messenger service system. The second socket comprises a messenger central server socket for receiving and processing the user state change information provided from a messenger central server of the messenger system and a message notification server socket for receiving and processing user offline state information provided from a message notification server of the messenger system.

Another aspect of the present invention provides a method for providing notification service using messenger in system comprising a messenger system, a synchronization server and at least one external service system, the method being performed in the synchronization server comprising the steps of: (a) receiving messenger user state change information from the messenger system; (b) transmitting the user state change information to the at least one external service system; (c) when a predetermined event occurs in the at least one external service system, receiving event occurrence information from the at least one external service system, the external service system managing online user information using the user state change information received in said step (b) and transmits the event occurrence information if a user associated with the event is in online state; and (d) transmitting the event occurrence information to the messenger system.

Still another aspect of the present invention provides a method for providing notification service using messenger in system comprising a messenger system, a synchronization server and at least one external service system, comprising the steps of: step for the messenger system to monitor messenger user state and transmit user state change information to the synchronization server; step for the synchronization server to transmit the user state change information to at least one external service system; step for the at least one external service system to manage messenger online user information using the user state change information; step for the at least one external service system, when predetermined event occurs in the external service system, to determine if user associated with the event is in online state; step for the at least one external service system, if the user associated with the event is in online state, to generate event occurrence information and transmit the event occurrence information to the synchronization server; and step for the synchronization server to transmit the event occurrence information to the messenger system.

DETAILED DESCRIPTION OF EMBODIMENTS

Hereinafter, various embodiments of the present invention will be described with reference to the accompanying drawings.

Figure 1:
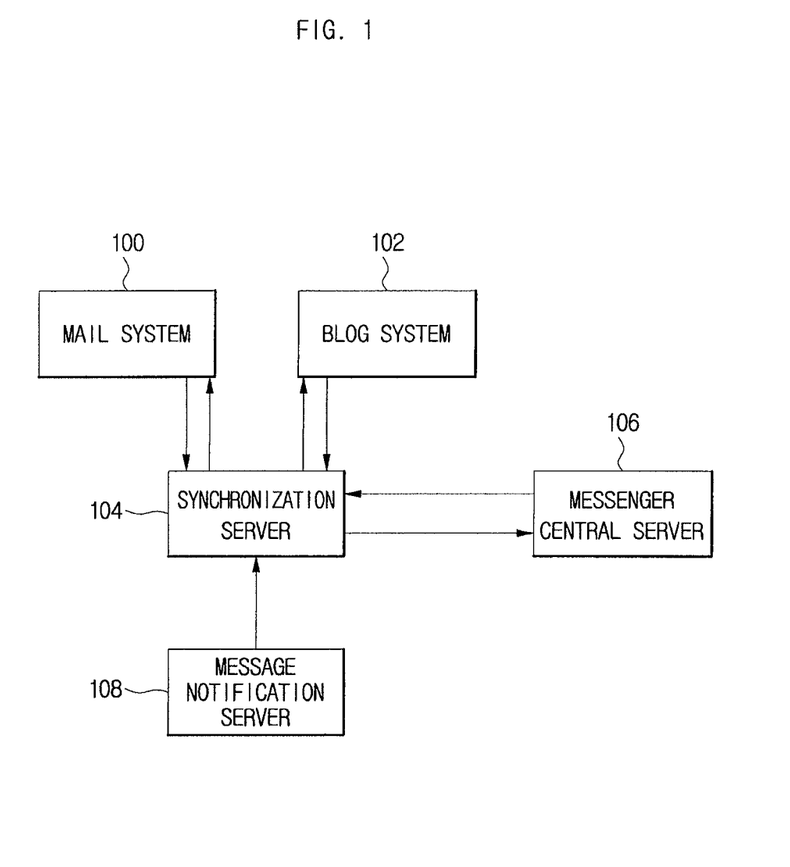
FIG. 1 is a notification system using a messenger according to an embodiment of the present invention.

FIG. 1 is a notification system using a messenger according to an embodiment of the present invention. Referring to FIG. 1, a notification system using a messenger may comprise an email system 100, a blog system 102, a synchronization server 104, a messenger central server 106 and a message notification server 108. The notification system of an embodiment of the present invention notifies events occurred at external service system such as email and blog through messengers. In FIG. 1, as examples of external system, email system 100 and blog system 102 is illustrated. However, it would be obvious to those skilled in the art that the external service system may further include internet community system, file storage service system, personal homepage system and so on.

In FIG. 1, the synchronization server 104 receives online/offline information of a particular user from the messenger central server 106 of messenger service system and transfers the received information to other service systems including email system 100 and blog system 102. When a user's status is changed from offline state to online state or from online state to offline state, state change information is transmitted to the messenger central server, and the messenger central server relays the received state change information to the synchronization server 104.

According to an embodiment of the present invention, the synchronization server 104 performs socket communication with the messenger central server and if the state change information is received from the messenger central server, the synchronization server 104 relays the state change information to external service system such as email system. As synchronization server 104 transmits state change information of messenger users to the email system 100 and the blog system 102, the email system 100 and the blog system 102 can construct database of users who are in online.

According to an embodiment of the present invention, the synchronization server 104 communicates with a server of email system (generally, email server) or a server of blog system (generally, blog server) through socket. Further, when notification message is transmitted to the synchronization server 104 on account of event occurrence, the synchronization server 104 provides the received notification message to the messenger central server 106. The external service system such as email system 100 and the blog system 102 communicates with the messenger central server 106 through the synchronization server 104 and receives the state change information of users from the synchronization server.

Although it is not shown in FIG. 1, the email system 100 and the blog system 102 includes a user database which manages messenger online user information, and the email system 100 and the blog system 102 updates the user database in response to the state change information transmitted from the synchronization server 104. As the email system 100 and the blog system 102 receives information on users who are online to messenger continuously, the email system 100 and the blog system 102 can check users who are online to messenger presently in real time. If predetermined event occurs, the external service system such as email system 100 and the blog system 102 generates notification message regarding the event occurrence to transmit the notification message to the synchronization server 104.

According to an embodiment of the present invention, if the email system 100 receives new email of a user, the email system 100 generates notification message which indicates new email arrival for the corresponding user to transmit the notification message to the synchronization server 104. The email system can generate notification message only when email from a predetermined user arrives. According to an embodiment of the present invention, when a new message is posted in a user's blog, the blog system 102 generates a notification message indicating that new message is posted in the corresponding user's blog to transmit the message to the synchronization server 104.

Although it is not shown in FIG. 1, when an internet community system is connected to the synchronization server, the internet community system may generate a notification message for community members indicating that new message is posted in community board and transmit the notification message to the synchronization server 104. Besides above-mentioned events, various events may be set for the external service system such as email system and the blog system.

According to an embodiment of the present invention, the external service system such as email system and the blog system refers to database storing online user information and transmits notification message only to online users. Therefore, message size can be minimized and load of server can be reduced. Further, the number of message packets is relatively small, and thus notification messages can be provided for various services including email, blog, internet community and so on.

The messenger central server 106 controls instant message transmission. The messenger central server manages client connection and processes transmitted messages and other request information. In an embodiment of the present invention, the messenger central server 106 checks online/offline state of users and when state of a user is changed, the messenger central server transmits state change information to the synchronization server 104. The messenger central server may transmit the state change information in real time, otherwise, transmit the state change information at predetermined time interval. Further, the messenger central server 106 of an embodiment of the present invention receives notification messages generated in external service systems from synchronization server 104 and transmits the received notification messages to associated users.

The message notification server 108 stores message packets transmitted from the messenger clients in queue and provides the stored message sequentially to the messenger central server 106. Besides message packets, when a user logs off, information on log-off is also transmitted to the message notification server 108, and the transmitted information is transmitted to the messenger central server 106.

Figure 2:
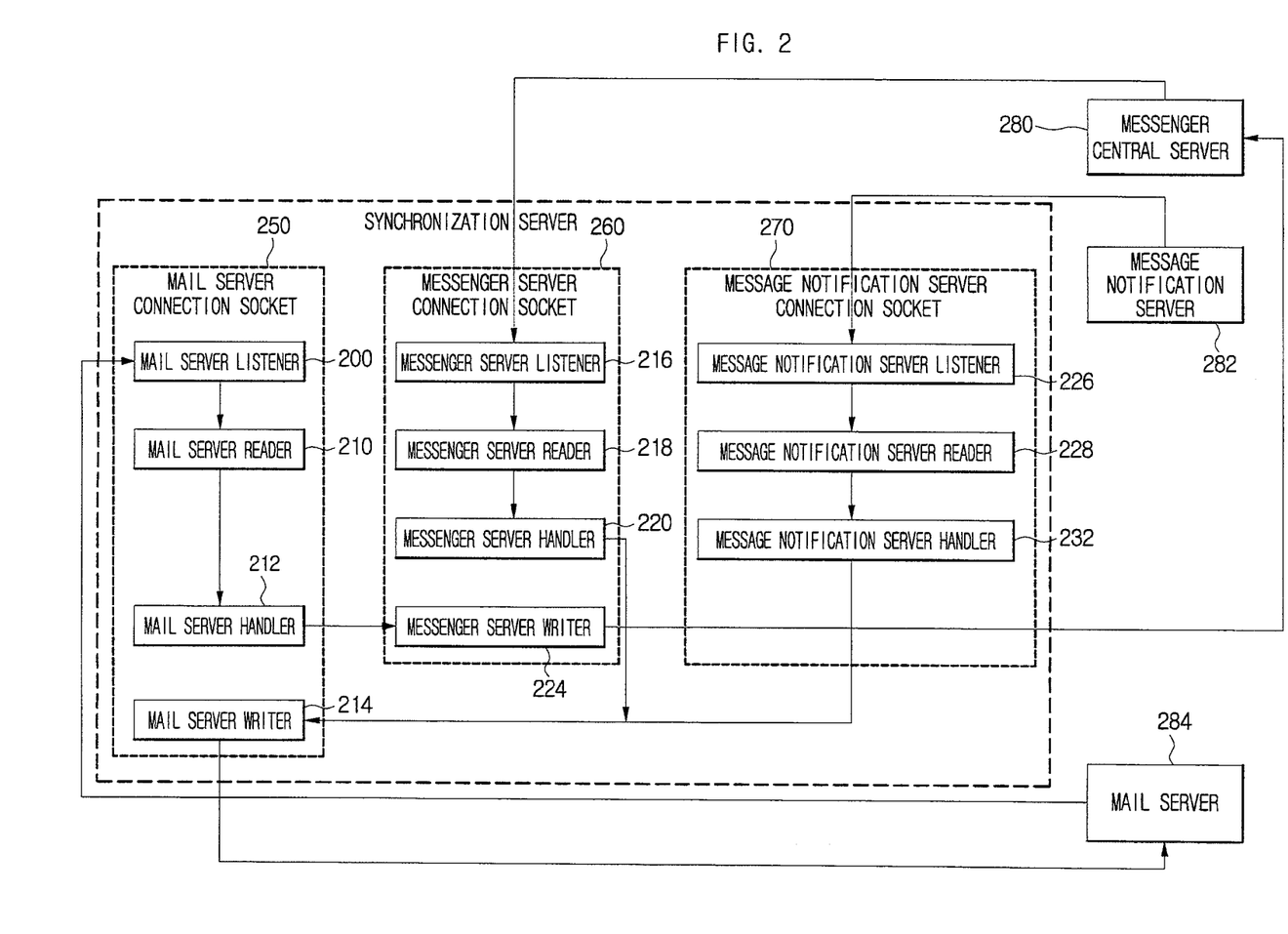
FIG. 2 is a block diagram for module of synchronization server according to an embodiment of the present invention.

FIG. 2 is a block diagram for modules of a synchronization server according to an embodiment of the present invention. Referring to FIG. 2, the synchronization server according to an embodiment of the present invention may comprise an email server connection socket 250, messenger server connection socket 260 and a message notification server connection socket 270. As shown in FIG. 2, each of the sockets may include a listener, reader, handler and writer. In FIG. 2, a queue is not included in each of the connection socket. However, it would be obvious to those skilled in the art that a queue can be included between the listener and reader if the number of packets increases.

Further, in FIG. 2, the case that servers communicate by socket communication, however, other communication method except socket communication can be employed for communication between servers. The email server connection socket 250 receives information on email arrival for a user and transmits state change information of a user received from the messenger central server to the email server. When email is received in the email server, email server listener 200 of the email server connection socket receives the notification message regarding the email arrival.

Besides notification messages, the email server may also transmit request for online user information when online user information is lost because of server trouble. Further, request packet for online user information is also received by the email server listener 200. Generally listener detects connection establishment with a node that sends message and relays packet transmitted from the node to the reader. The email server listener 200 monitors if notification message packet is transmitted from the email server and if the notification message packet is received, the email server listener relays the notification packet to the email server reader 202. If a queue is included, the packet received in listener may be stored in the queue in FIFO method through a writer.

According to an embodiment of the present invention, socket communication between the email server listener and the email server is performed by TCP protocol. However, it would be obvious to those skilled in the art that UDP protocol can be used or multicasting can also be used.

The email server reader reads packet received by listener 210 and provides the packet to the email server handler 212. When notification message packet indicating email arrival information is transmitted from the email server, the email server handler determines that received packet is a notification packet through packet analysis and performs protocol transformation and provides the packet of which the protocol is transformed to the messenger server writer 224. As communication protocols of email system and the messenger system are different from one another, protocol transformation is generally performed. However, when parameters and protocols of both systems are not different, the protocol transformation may not be performed. More detailed explanation for protocol transformation is described later referring to other figures.

The messenger server connection socket 260 receives user state change information from the messenger central server, provides notification messages from the email server socket to the messenger central server. When the online/offline state of a user changes, the messenger central server transmits user state change information to the synchronization server, and the messenger server listener 216 of the synchronization server receives the user state change information. The messenger server listener provides the received user state information to the messenger server reader 218. As described above, when a queue is included in the socket, the messenger server listener may control writer to store the packet in the queue. The messenger server reader 218 reads the information received in the messenger server listener and provides the read information to the messenger server handler 220.

When transmitted packet from the messenger server is user online/offline state information, the messenger server handler performs protocol transformation and provides the transformed information to the email server writer 214. The email server writer 214 transmits processed information by email server handler to the email server and the email server manages online user information.

The message notification server connection socket 270 receives user state change information together with the messenger server connection socket 260 and provides the received information to the email server. Although user online/offline state information is also managed by messenger central server, user offline state information is transferred firstly to the message notification server. The message notification server firstly receives messages or other information that users send and provides them to the messenger central server. When user turns off messenger, the message notification server provides user offline state information to the messenger central server and also provides the user offline state information to the synchronization server.

User offline information transmitted from the message notification server is received by message notification server listener 226, the message notification server reader 228 reads received information by the message notification server listener 226 and provides the read information to the message notification server handler 232. The message notification server handler 232 transforms packet protocol of user offline information packet and provides the transformed protocol packet to the email server writer 214. As the message notification server need not notification messages or other messages from external server such as email server, the message notification server socket does not include writer.

Further, the message notification server socket is an additional module for transmitting user state change information more accurately, and therefore, an embodiment of the present invention can be accomplished without message notification server socket. In FIG. 2, only sockets for communication with the email server are illustrated. However, sockets for communication with community server, blog server, etc. can be further included.

Figure 3:
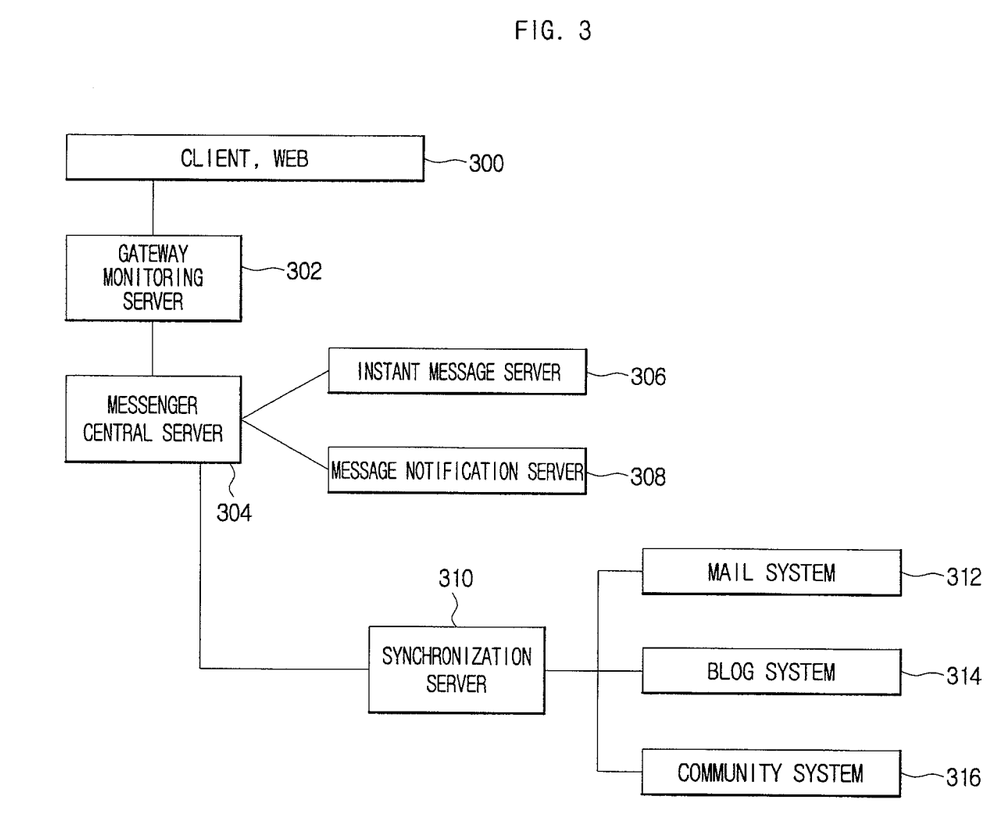
FIG. 3 is connection relation between the messenger system and the synchronization server according to an embodiment of the present invention.

FIG. 3 is connection relation between the messenger system and the synchronization server according to an embodiment of the present invention. Referring to FIG. 3, the gateway monitoring server 302 receives connection request to the messenger system from messenger clients 300 through web, processes the request and provides address information of messenger central server where messenger clients connect. That is, when user requests to connect the messenger system, the request information is transmitted to the gateway monitoring server 302. User connection information processed by the gateway monitoring server 302 is transmitted to the messenger central server 304. The gateway monitoring server also manages user state information besides user connection information. For example, the gateway monitoring server receives state information such as 'not seated' or 'in other task' and manages the information.

The messenger central server 304 controls instant message transmission operation, manages connections of messenger clients and processes messages transmitted from the clients and other request information. When user connection request is processed by the gateway monitoring server 302, the messenger central server 304 of an embodiment of the present invention provides the user online connection information to the synchronization server 310.

When online user transmits/receives messages with other users, the messages are transmitted to the message notification server 308. The message notification server maintains socket connection with messenger clients, receives messages from users and provides the message to the messenger central server sequentially. When user turns off messenger, messenger off information is also transmitted to the message notification server, and the message notification server provides the user offline information to the messenger central server 304. User offline information can also be managed by gateway motoring server, not by the message notification server.

The instant message server 306 manages instant messaging session between messenger clients and relays message packets that messenger clients send. The instant message server receives message from the messenger central server and relays the received message packet to other messenger client.

The synchronization server 310 transmits user online/offline information to predetermined server of each service system. In FIG. 3, email system, blog system 314 and the community system are illustrated; however, as described above, embodiments of the present invention can provide online/offline information to other systems.

Figure 4:
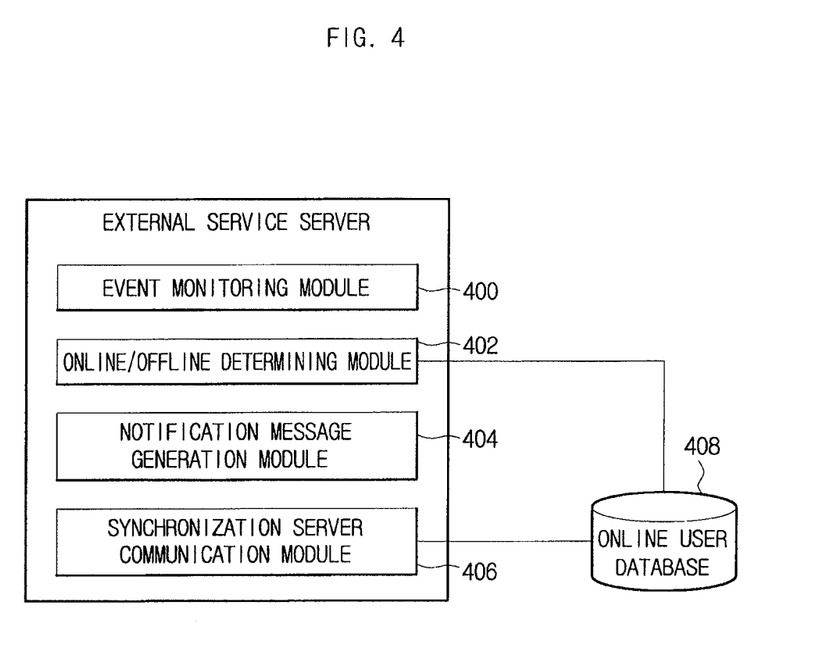
FIG. 4 is module of the external server communicating with the synchronization server according to an embodiment of the present invention.

FIG. 4 is module of the external server communicating with the synchronization server according to an embodiment of the present invention. The external server may include email sever, blog server and community server, only modules for providing notification service of an embodiment the present invention are illustrated in FIG. 4. Referring to FIG. 4, the external server for providing notification service may comprise an event monitoring module 400, an online/offline determining module 402, a notification message generation module 404 and a synchronization server communication module 406.

The event monitoring module monitors if predetermined events for providing notification messages occur. If the external server is an email server, the event monitoring module 400 monitors if new email arrives at email box. If the external server is a blog server, the event monitoring module monitors if a new message is posted. When the external server is an email server, the event monitoring module 400 may monitor email arrival event occurrence though communication with MDA (Mail Delivery Agent) or email box. When an event occurrence is detected, the event monitoring module 400 provide the event occurrence information to the online/offline determining module 402.

The online/offline determining module 402 analyzes the event occurrence information provided from the event monitoring module 400 and determines user associated with the event and determines if the user associated with the event is in online state. When email arrival information is to be provided to a messenger user, the online/offline determining module 402 determines email receiver as the user associated with the event. When new message is posted in community, the online/offline determining module 402 determines members of the corresponding community as the user associated with the event. At this case, the online/offline determining module may derive community member information.

As described referring to FIG. 1 to FIG. 3, as the messenger online user information is stored in the online user database 408 coupled to the external server, the online/offline determining module refers to information of the online user database 408 and determines if the user associated with the event is in online state.

The notification message generation module generates a notification message if the user associated with event is in online state. The notification message may include information on kind of event, message receiver and event related information (in case of email, email sender information).

The synchronization server communication module 406 transmits the generated notification message through the socket and receives user online/offline state information from the writer of synchronization server connection socket. The synchronization server 406 updates user online/offline information through communication with the online user database 408.

Figure 5:
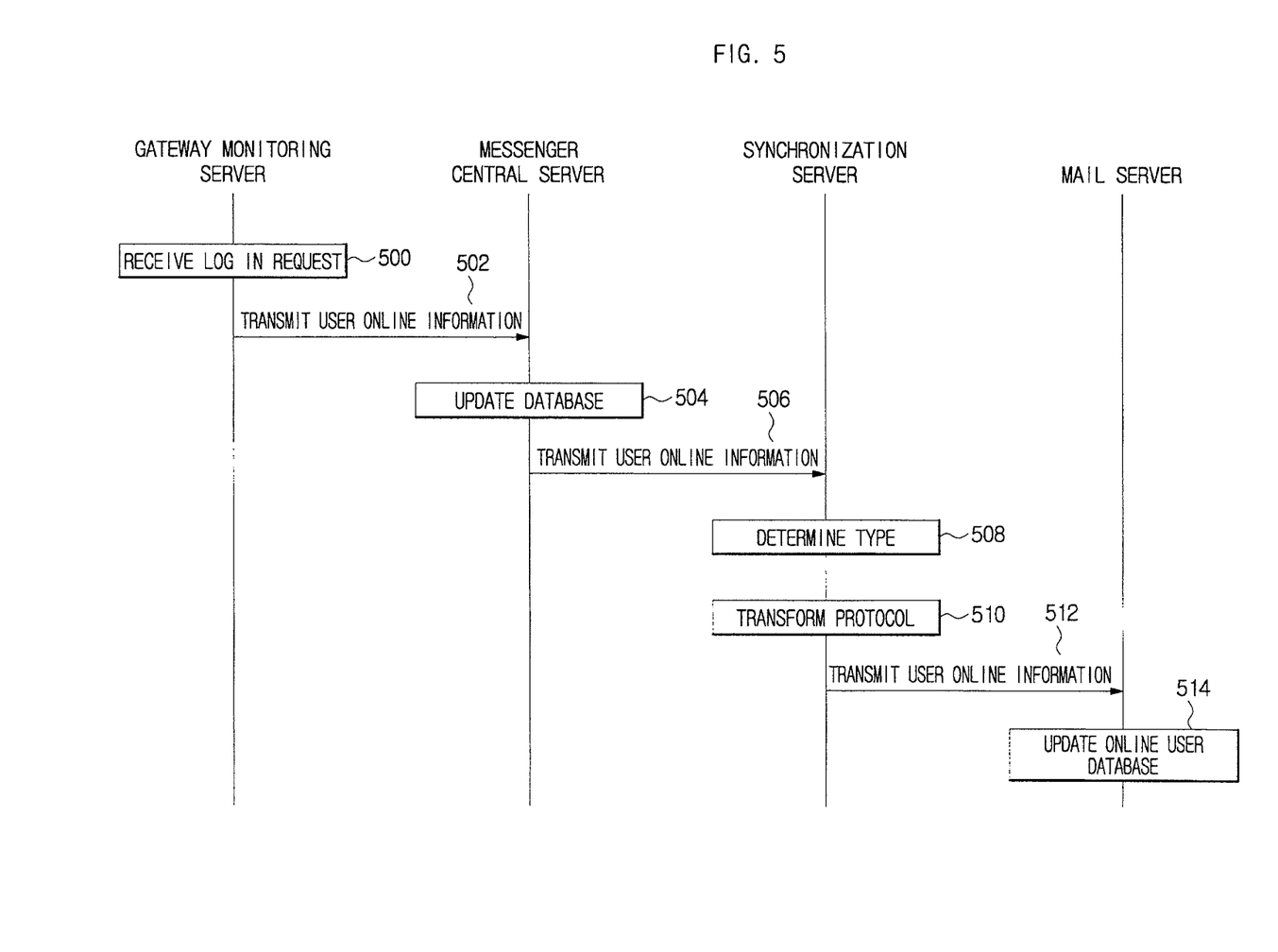
FIG. 5 is a flow chart for showing processes that user online information is provided to the external server when user logs in the messenger according to an embodiment of the present invention.

FIG. 5 is a flow chart for showing processes that user online information is provided to the external server when user logs in the messenger according to an embodiment of the present invention. Referring to FIG. 5, when a user requests to log in the messenger, the messenger log-in request is transmitted to the gateway monitoring server step 500. The gateway monitoring server determines if user ID and password is valid and transmits the user online information to the messenger central server if user ID and password is valid step 502.

The messenger central server updates online user information through communication with the gateway monitoring server step 504, and the messenger central server transmits online information of a user to the synchronization server step 506. The user online information transmitted from the messenger central server to the synchronization server has predetermined packet protocol, the packet configuration is shown in FIG. 9.

Figure 9:
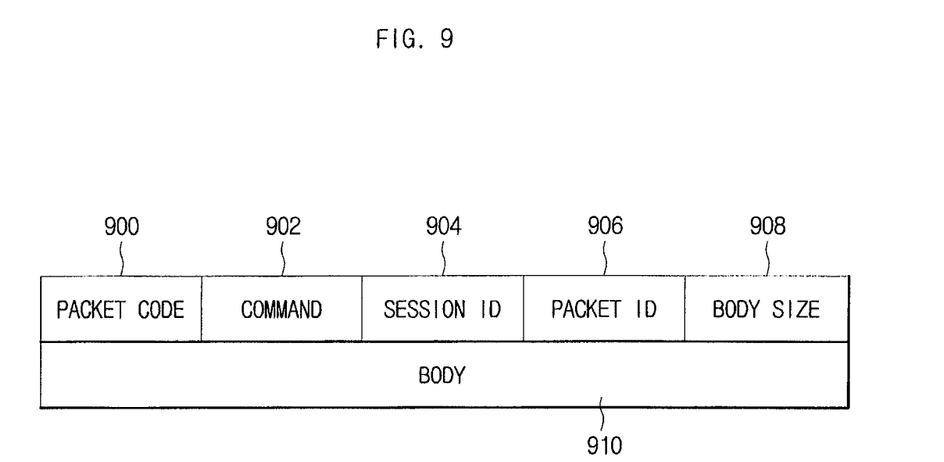
FIG. 9 is a packet configuration of a packet transmitted from the messenger central server or the external server to the synchronization server according to an embodiment of the present invention.

FIG. 9 is a packet configuration of a packet transmitted from the messenger central server or the external server to the synchronization server according to an embodiment of the present invention. Referring to FIG. 9, the protocol packet according to an embodiment of the present invention may include a packet code filed 900, a command field 902, a session ID field 904, a packet ID field 906, a body size field 908 and a body field 910. In FIG. 9, information on packet transmission method is written in the packet code field 900. For example, transmission method including unicast, multicast and broadcast is written in the packet code field 900.

Identification information on packet kind is written in the command field 902. For example, identification information on whether the packet is for transmission of user online information or user offline information is written in the command field 902. Session information including file indicator is written in the session ID field 906, and unique ID for each packet is written in the packet ID field 906. Size information of body field is written in the body size field 908 for detecting transmission error, etc. Detailed information depending on packet kind is written in the body field 910. For example, when the packet is for notifying online/offline information of a user, user ID may be written in the body field 910. When the packet is for notifying email arrival of a user, email receiver ID and email sender nickname may be written in the body field 910.

The synchronization server that received user online information from the messenger central server determines that the packet is for notifying online information through the command information of the packet 508, and transforms the protocol of the packet into the protocol corresponding to the email server 510.

According to an embodiment of the present invention, the protocol transformation may be performed by changing only the parameter of the packet command field into the parameter corresponding to the email server.

As the command parameters used in the messenger server and the email server are different from one another, the synchronization server transforms command parameter in the packet command field into command parameter of messenger server. For example, if command for indicating online information of a user between the messenger central server and the synchronization server is CM2SALogin, and the command for indicating online information of a user in the email server is ON, the synchronization server transforms the CM2SALogin written in the packet command filed into ON.

Transformed protocol packet related to the user online information is transmitted to the email server step 512, and the email server analyzes the received packet to update the online user database step 514.

Figure 6:
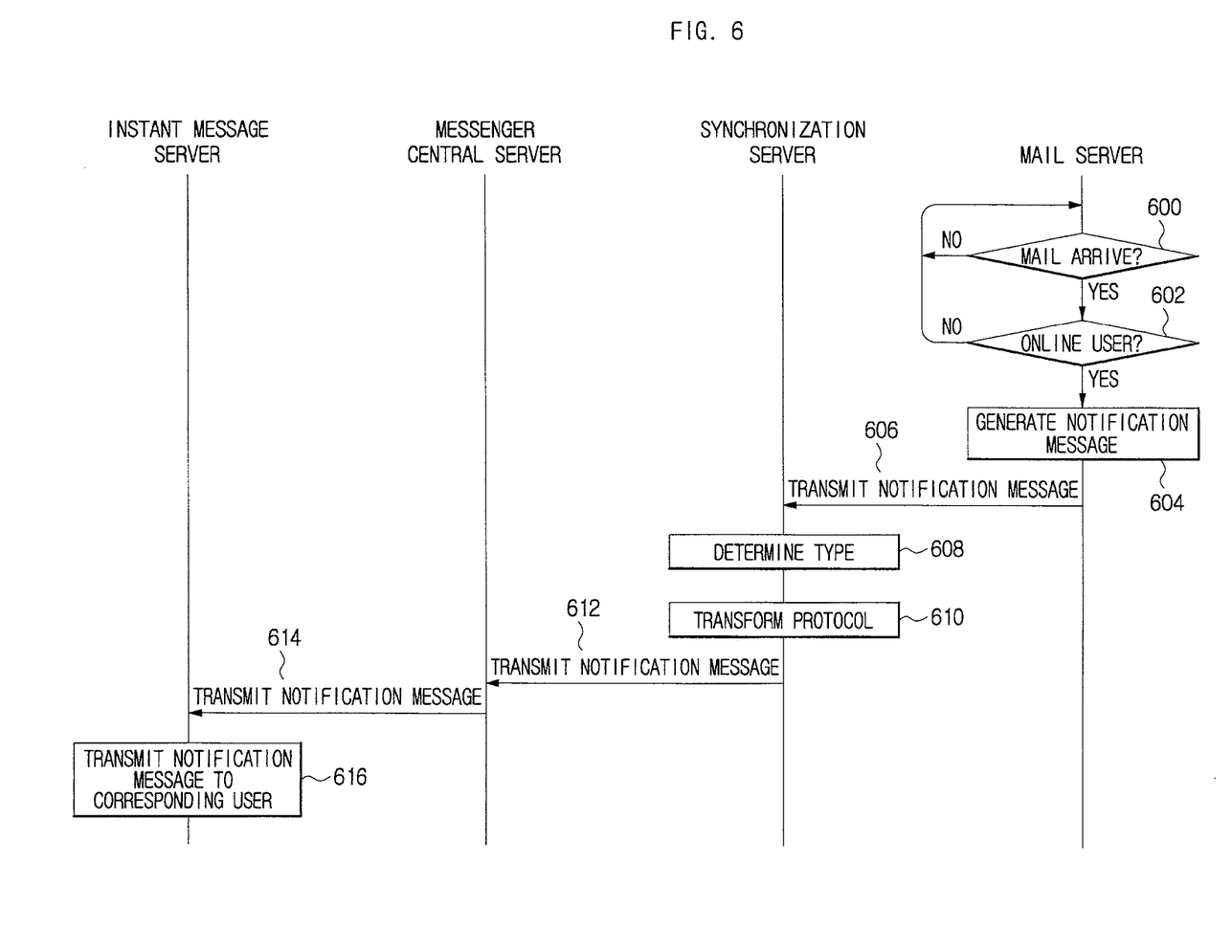
FIG. 6 is a flow chart for showing processes that email server provides email arrival information as notification message according to an embodiment of the present invention.

FIG. 6 is a flow chart for showing processes that email server provides email arrival information as notification message according to an embodiment of the present invention. In FIG. 6, the case that notification message is provided when a new email arrives. Referring to FIG. 6, the email server monitors if new email arrives step 600. When a new email arrives, the email server derives email receiver ID and determines if the email receiver is in online state by referring to online user database step 602.

If email receiver is in online state, the email server generates notification message protocol packet shown in FIG. 9 step 604. Email receiver ID and email sender nickname may be written in the body filed of the notification message packet. The generated notification message is transmitted to the synchronization server step 606.

The synchronization server determines that received packet is for notifying email arrival through identification information of the notification message packet step 608, and the synchronization server transforms the protocol of the packet into the protocol corresponding to the messenger central server step 610. As described above, the protocol transformation may be performed by transforming parameter of packet command field.

The synchronization server transmits the transformed notification message to the messenger central server step 612, and the messenger central server commands the instant message server to transmit the notification message while relaying the notification message to the instant message server step 614. The instant message server analyzes the notification message packet and transmits the notification message to the corresponding user step 616.

Figure 7:
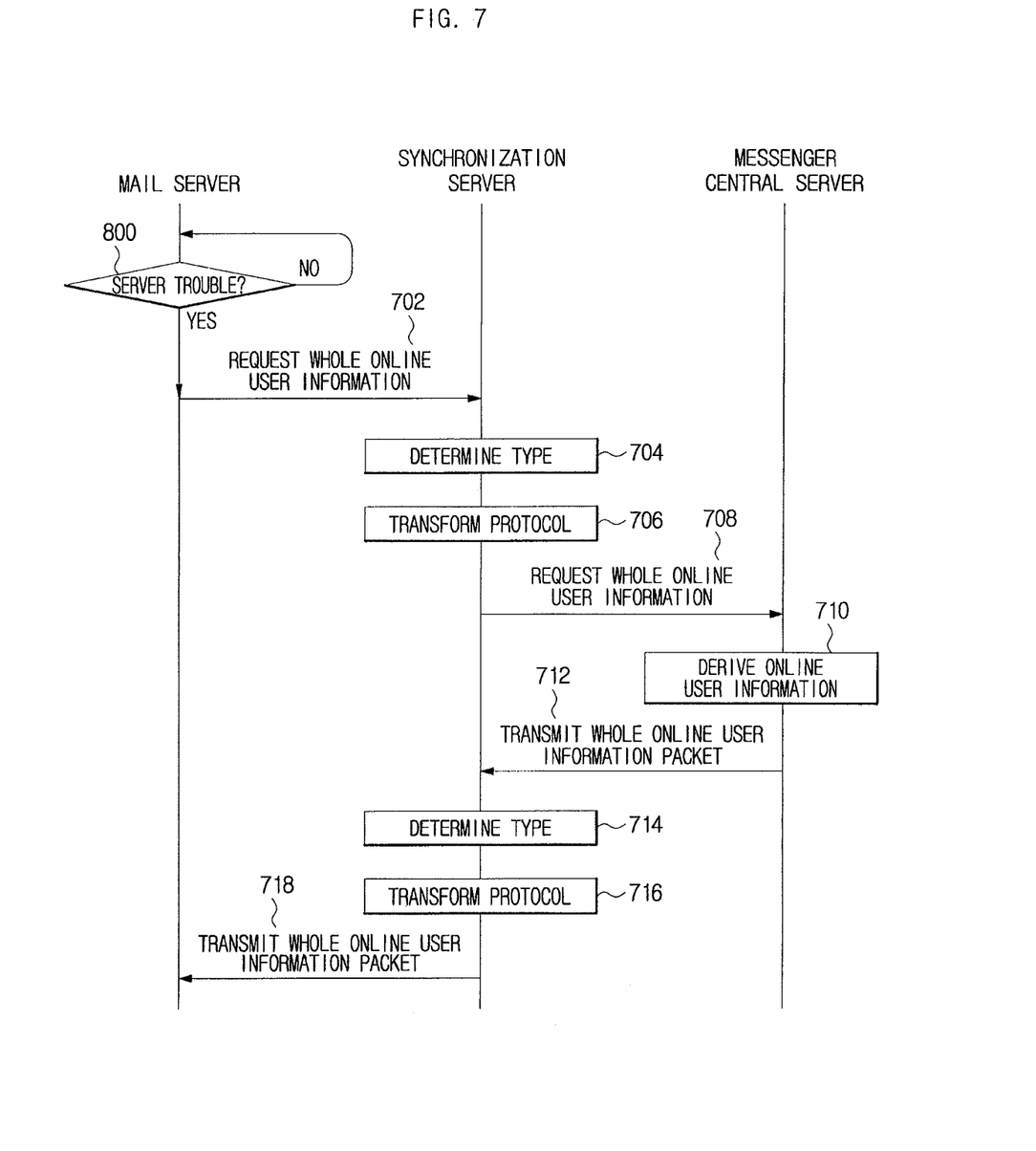
FIG. 7 is a flow chart for showing recovering processes when online user information is lost because of email system trouble according to an embodiment of the present invention.

FIG. 7 is a flow chart for showing recovering processes when online user information is lost because of email system trouble according to an embodiment of the present invention. When the external service system such as the email system is in trouble or in upgrade and system checking, the external service system becomes off-state and the whole online user information need to be transmitted to the external service system. FIG. 7 illustrates operation processes in this case. In FIG. 7, an exemplary email system is illustrated, but it would be obvious to those skilled in the art that the processes in FIG. 7 can also be applied to other external service systems. Referring to FIG. 7, when an event such as server trouble or system upgrade occurs step 700, the email server transmits the whole online user request information to the synchronization server step 702.

The synchronization server analyzes command field of the packet and determines that whole online user information is requested step 704 and the synchronization server transforms packet protocol step 706. The whole online user request packet transformed by the synchronization server is transmitted to the messenger central server step 708. The messenger central server derives whole online user information from database in response to the whole online user request step 710. The messenger central server divides whole online user information into predetermined size, and transmits the packet including the divided information to the synchronization server step 712.

The synchronization server determines that the received packet includes whole online user information through the command information of the packet step 714, and the synchronization server transforms the protocol of the packet into the protocol corresponding to the email server step 716. The synchronization server transmits the transformed whole online user information packet to the email server and the email server updates online user database using the whole online user information included in the packet.

Figure 8:
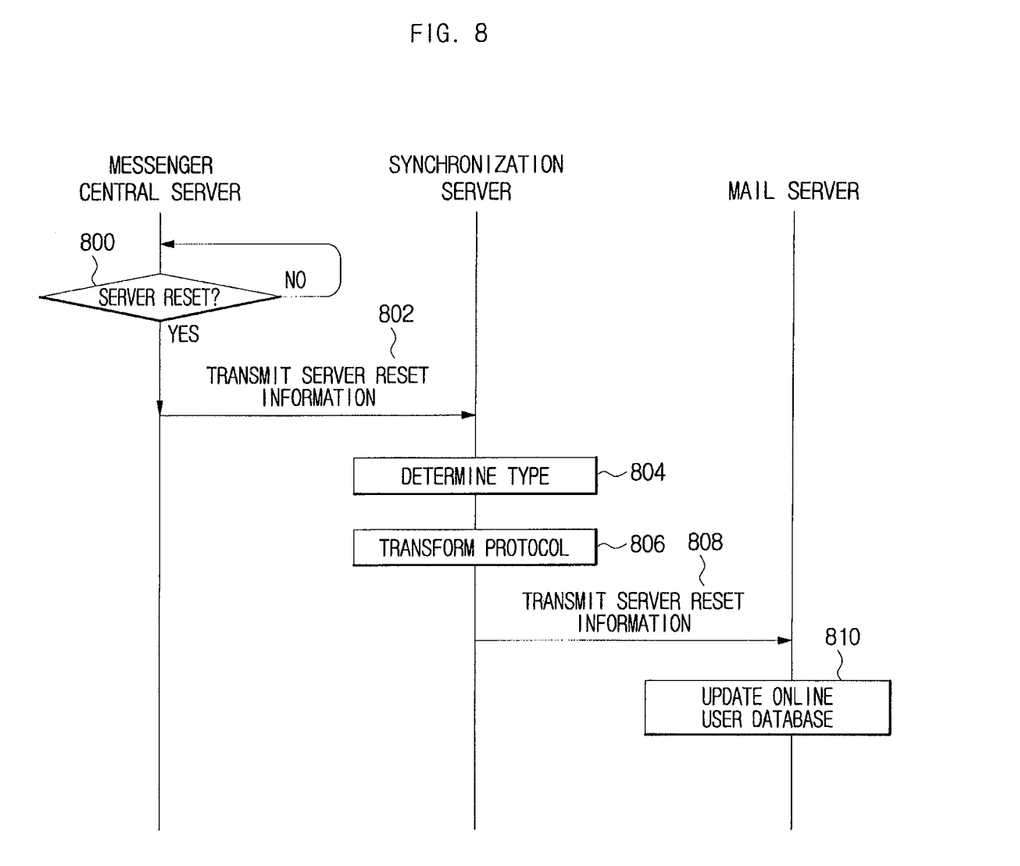
FIG. 8 is a flow chart for showing processes that messenger server reset information is transmitted to the email server when messenger system is in trouble according to an embodiment of the present invention.

FIG. 8 is a flow chart for showing processes that messenger server reset information is transmitted to the email server when messenger system is in trouble according to an embodiment of the present invention. When messenger server is reset, all connections of messenger users are disconnected, and therefore, providing server reset information is more preferable than providing each user's offline information in order to update messenger online user information at a time. Referring to FIG. 8, when messenger system becomes off state because of system upgrade or when messenger central server is reset because of system trouble step 800, the messenger central server transmits server reset information to the synchronization server step 802.

The synchronization server analyzes the command field of the received packet and determines that received packer is for notifying messenger central server reset step 804. The synchronization server transforms packet protocol step 806. The transformed packet is transmitted to the email server step 808, and the email server determines that messenger central server is reset through analysis of the packet and reflects the information that no online user exists into the online user database step 810. Although example for email system is illustrated in FIG. 8, the process of FIG. 8 can also be other external service systems on messenger server reset.

As described above, according to an embodiment of the present invention, events occurring in various services can be notified through messenger while minimizing server load. Further, according to an embodiment of the present invention, notification messages can be provided to only users that are online in messenger, by which the number of notification message packets can be minimized The accompanying drawings and the detailed description are to only describe embodiments of the present invention, the scope of the present invention is not limited thereto. Therefore, those who skilled in the art will understand that many changes and equivalent embodiments can be made without departing from the spirit and aspect of the present invention. Thus, the scope of the present invention is be determined by the accompanying claims.

What is claimed is:

1. A method of operating an internet messaging service based on an interface server connected to a messenger server configured to provide instant messaging service and connected to a service server configured to provide Internet service, the method comprising:
    receiving, by the interface server, user on-line information indicating a log-in status of a user with the messenger server, from the messenger server in response to the user's log-in with the messenger server from a messenger client of the user, wherein the user on-line information is directed to a designated internet address;
    transmitting, by the interface server, the user on-line information to the service server; receiving, by the interface server, a notification directed to the user from the service server while the user is on-line with the messenger server, wherein the notification is to notify an occurrence of an event regarding an internet service provided by the service server;
    forwarding, by the interface server, the notification so that the user receives the notification on the messenger client; and
    transmitting to the service server user off-line information indicating a log-off status of the user with the messenger server, in response to the user's log-off from the messenger server so that the service server does not forward a notification of an event regarding the internet service until receiving subsequent user on-line information indicating a log-in status of the user with the messenger server.

2. The method of claim 1, wherein the internet address is that of the service server of the internet service.

3. The method of claim 1, wherein the internet address is that of the interface server.

4. The method of claim 1, wherein the user off-line information is directed to the designated internet address.

5. The method of claim 1, wherein the internet service comprises an emailing service, and wherein the event comprises receipt of an incoming email to the user in the emailing service.

6. The method of claim 1, wherein the internet service comprises a message posting service accessible by a plurality of users, and wherein the event comprises a posting of a message in the message posting service.

7. A method of operating an internet service based on a service server configured to provide Internet service to a user, the method comprising:
    receiving, by the service server, user status information indicative of the user's status of being on-line or off-line with a messenger server for an instant messaging service and storing the user status information in a user database;
    in response to an event to report to the user occurring, determining whether the user's status is on-line or off-line based on the stored user status information, wherein the event is related to an internet service provided by the service center;
    transmitting a notification directed to the user with respect to the event in response to a determination that the user's status is on-line with respect to the instant messaging service, and not transmitting a notification in response to a determination that the user's status is off-line with respect to the instant messaging service until receiving user status information indicative of the user's status of being on-line with the messenger server, wherein the notification is to notify the occurrence of the event.

8. The method of claim 7, wherein the notification is transmitted to the messenger server.

9. The method of claim 7, wherein the notification is transmitted to a designated internet address other than the messenger server.

10. The method of claim 7, wherein the internet service comprises an emailing service, and wherein the event comprises receipt of an incoming email to the user in the emailing service.

11. The method of claim 7, wherein the internet service comprises a message posting service accessible by a plurality of users, and wherein the event comprises a posting of a message in the message posting service.

12. The method of claim 7, wherein if the user status information is not received by the service server, sending a request for information of users being on-line.

13. A device for interfacing at least two service servers, the device comprising:
    a first socket configured to communicate with a messenger server for an instant messaging service, and configured to receive a first packet comprising user on-line information indicative of a user's status of being on-line or off-line with the instant messaging service, the first packet further comprising first protocol information indicative of a first protocol for processing the user on-line information in the messenger server;
    a second socket configured to communicate with a service server for an internet service other than the instant messaging service, and configured to transmit a second packet comprising the user on-line information, such that the service server transmits a notification directed to the user with respect to an event regarding the internet service in response to a determination that the user's status is on-line with respect to the instant messaging service, and does not transmit a notification in response to a determination that the user's status is off-line with respect to the instant messaging service until receiving the user on-line information, wherein the notification is to notify an occurrence of the event; and a processor configured to convert the first protocol information to second protocol information indicative of a second protocol for processing the user on-line information in the service server, wherein the second packet further comprises the second protocol information.

14. The device of claim 13, wherein the second socket is further configured to receive a third packet comprising the notification from the service server, wherein the notification is to notify an event in the internet service associated with a user subscribing to both the instant messaging service and the internet service.

15. The device of claim 14, wherein the first socket is further configured to transmit a fourth packet comprising the notification, wherein the third packet further comprises third protocol information indicative of the second protocol, and wherein the fourth packet further comprises fourth protocol information indicative of the first protocol.

16. The device of claim 15, wherein the processor is further configured to convert the third protocol information to the fourth protocol information.

17. The device of claim 13, further comprising a third socket configured to communicate with the service server, wherein the third socket is configured to receive a notification from the service server, wherein the notification is to notify an event in the internet service associated with a user subscribing to both the instant messaging service and the internet service.

18. A method of operating a device for interfacing a messenger server for an instant messaging service and a service server for internet service, the method comprising:

receiving, from the messenger server, user on-line information indicative of a user's status of being on-line with the messenger server;

transmitting the user on-line information to the service server associated with an internet service, such that the service server is informed of the user's status of being on-line with the messenger server;

receiving, from the service server, a notification of an occurrence of an event associated with the user in the internet service, in response to the event occurring during the user's status of being on-line with the messenger server;

transmitting the notification to the messenger server so as to notify the user who is on-line with the messenger server, receiving user off-line information indicative of the user's status of being off-line from the messenger server; and transmitting the user off-line information to the service server such that the service server is informed of the user's status of being off-line from the messenger server and does not send a notification directed to the user.

19. The method of claim 18, wherein the user on-line information is received and transmitted as part of a packet comprising data indicative of a protocol for processing the user on-line information.

20. The method of claim 19, wherein the messenger server is configured to use a first protocol, wherein the service server is configured to use a second protocol, wherein the received packet comprising the user on-line information comprises data indicative of the first protocol, and wherein the method further comprises changing the first protocol to the second protocol before transmitting.

21. The method of claim 18, wherein the notification is received and transmitted as part of a packet comprising data indicative of a protocol for processing the notification.

22. The method of claim 21, wherein the messenger server is configured to use a first protocol, wherein the service server is configured to use a second protocol, wherein the received packet comprising the notification comprises data indicative of the second protocol, and wherein the method further comprises changing the second protocol to the first protocol before transmitting.

23. The method of claim 18, wherein the internet service comprises an emailing service, and wherein the event comprises receipt of an incoming email to the user in the emailing service.

24. The method of claim 18, wherein the internet service comprises a message posting service accessible by a plurality of users, and wherein the event comprises a posting of a message in the message posting service.

* * * * *